(12) United States Patent
Chen

(10) Patent No.: US 8,029,268 B2
(45) Date of Patent: Oct. 4, 2011

(54) COOLING FETCH APPARATUS OF PERFORMS

(75) Inventor: Le Huang Chen, Shulin (TW)

(73) Assignee: Jet-Engine Automation Co., Ltd., Taipei County (TW)

( * ) Notice: Subject to any disclaimer, the term of this patent is extended or adjusted under 35 U.S.C. 154(b) by 0 days.

(21) Appl. No.: 12/068,646

(22) Filed: Feb. 8, 2008

(65) Prior Publication Data

US 2010/0276848 A1 Nov. 4, 2010

(51) Int. Cl.
*B29C 35/16* (2006.01)
*B29C 45/72* (2006.01)
*B29C 49/64* (2006.01)

(52) U.S. Cl. .................. 425/526; 425/533; 425/534

(58) Field of Classification Search .................. 264/526; 425/526, 533, 534
See application file for complete search history.

(56) References Cited

U.S. PATENT DOCUMENTS

| 4,592,719 | A | * | 6/1986 | Bellehache et al. | 425/526 |
| 5,447,426 | A | * | 9/1995 | Gessner et al. | 425/436 R |
| 6,099,766 | A | * | 8/2000 | Aoki et al. | 264/39 |
| 6,186,736 | B1 | * | 2/2001 | Lust et al. | 414/800 |
| 6,488,878 | B1 | * | 12/2002 | Neter et al. | 264/237 |
| 6,663,813 | B2 | * | 12/2003 | Neter | 264/237 |
| 6,957,954 | B2 | * | 10/2005 | Neter et al. | 425/556 |

* cited by examiner

*Primary Examiner* — Jill Heitbrink
(74) *Attorney, Agent, or Firm* — Rosenberg, Klein & Lee

(57) ABSTRACT

The present invention discloses a cooling fetch apparatus of performs, and the apparatus includes: a first fetch mechanism, moved back and forth, for fetching each perform formed in a mold of an injection molding machine from the mold; a second fetch mechanism, moved back and forth, for fetching each preform on the first fetch mechanism. After the second fetch mechanism fetches a predetermined quantity of performs, the performs on second fetch mechanism are unloaded sequentially, such that the injection molding process and the cooling process of the performs are separated. The timing of fetching each perform on the second fetch mechanism is controlled for assuring a good cooling effect of each preform.

16 Claims, 19 Drawing Sheets

COOLING FETCH APPARATUS OF PERFORMS

BACKGROUND OF THE INVENTION

1. Field of the Invention

The present invention relates to a manufacturing procedure of performs, and more particularly to a cooling fetch apparatus of preforms and a cooling fetch method thereof.

2. Description of the Related Art

Traditional preform injection molding machine forms a plurality of airtight closed mold cavities when a mold is clamped, and fills up the mold cavities with a melted plastic liquid after the melted plastic liquid is injected into the mold cavities. The performs are condensed and shaped after a predetermined time of sitting still and lowering the temperature, and then the mold is opened, and an ejector is used for ejecting the performs from the mold cavities to complete the whole manufacturing procedure of the preforms.

To cool and shape the injected performs and prevent damaging the shape of the performs due to collisions among the preforms during a demolding process, the manufacture of the aforementioned traditional preform injection molding machine requires condensing and shaping the injected performs after sitting still and lowering temperature for a predetermined time, and produce a complete shape after further cooling the performs for predetermined cooling and shaping time. However, the longer cooling time of the performs in the mold will take up the next injection molding time of the mold, and thus causing a delay to the whole injecting process and lowering the yield rate.

At present, there is another cooling device installed next to the preform injection molding machine as shown in FIG. 30, such that after a movable mold 1 is used for fetching the finished goods of each preform 3 in a mold 2, the preform 3 is moved to a cooling position 4, and provided for the cooling device 4 to cool each preform 3, wherein the cooling device 4 is comprised of a plurality of air nozzles 5 as shown in FIG. 31. If the movable mold 1 fetches the preform 3 to the cooling position 4, the cooling device 4 will be coupled to the movable mold 1, and each air nozzle 5 will be extended into each preform 3 for performing an air cooling process.

However, if this type of cooling device 4 is coupled with the movable mold 1 and each air nozzle 5 is used for performing air cooling to each preform 3, cool air is blown from each air nozzle 5 into each preform 3, and thus an airflow space 6 is disposed between each preform 3 and each air nozzle 5. If air is blown from each air nozzle 5 into each preform 3 for the cooling action, the cooled air blown from each air nozzle 5 will flow disorderly in each airflow space 6 to cause a whirl phenomenon, so that the cooling effect of the internal wall of each preform 3 is uneven, the internal wall of each preform 3 is deformed, and the overall yield rate of each preform 3 is affected. In addition, since the preform cooling method of this sort extends the nozzle 5 into the preform 3, therefore the cooling action is effective at the internal brink of the preform 3 only, and a good cooling effect at a bottle mouth of the preform 3 cannot be obtained. As a result, the bottle mouth of each preform 3 may be deformed easily, and the airtightness will be affected adversely when the bottle mouth and the bottle cap of each preform 3 are engaged with each other.

Further, the movable mold 1 in the mold 2 has three different fetch positions 1A, 1B, 1C as shown in FIG. 32, the movable mold 1 is moved to the first fetch position 1A, and each preform 3 in the mold 2 is fetched from the outside of the mold 2 and engaged with the cooling device 4 for the cooling action; and then the movable mold 1 is entered into the mold 2 again and moved to the second fetch position 1B as shown in FIG. 33, and each preform 3 is removed from the mold 2 for performing the cooling action. The movable mold 1 is moved to the third fetch position 1C (as shown in FIG. 34), such that the preform 3 can be removed from the mold 2 for performing the cooling action. Before the movable mold 1 fetches the preform, the material is unloaded at a fetch position of the preform 3 fetched by the movable mold 1, and this procedure is repeated, so that the preform 3 formed in the mold 2 can be cooled outside the mold 2.

However, the volume of the movable mold 1 and the cooling device 4 for this fetch method is very large, and thus occupying much space in a factory. When the mold 2 the movable mold 1 is fetched, the movable mold 1 still carries the previously fetched but still unloaded preform 3, so that the whole overall load of the movable mold 1 is large, and the efficiency of fetching each preform 3 is affected seriously, when the fetching speed of the movable mold 1 is very slow.

In view of the shortcomings of the prior art, the present invention provides a slide braking apparatus to overcome the shortcomings of the conventional braking structure.

SUMMARY OF THE INVENTION

Therefore, it is a primary objective of the present invention to provide a cooling fetch apparatus of preforms and a cooling fetch method thereof, wherein the perform injection molding process is separated from the perform cooling process, so that the injection molding machine can continue the injection molding without interruptions, so as to effectively improve the production efficiency of the preform.

Another objective of the present is to provide a cooling fetch apparatus of preforms and a cooling fetch method thereof, wherein a first stage of cooling an external brink of each perform is performed when the first clamp portion is used for fetching the performs. When the second clamp portion is coupled to each preform of the first clamp portion, the first clamp portion and the second clamp portion can cool the preform as well as its internal brink simultaneously, and provide a second stage of cooling action to the performs, and then the second clamp portion carries the preforms to the material collection position to perform a third stage of cooling to the internal brink of the performs, so that the invention can provide a plurality of stages of the cooling action to each preform and assure that the preforms are cooled to improve the yield rate of each preform effectively.

A further objective of the present invention is to provide a cooling fetch apparatus of preforms and a cooling fetch method thereof, wherein the second clamp portion of the second fetch mechanism completes three stages of cooling to each unloaded perform and extends the cooling time of each unloaded perform to provide a better cooling effect.

Another objective of the preset invention is to provide a cooling fetch apparatus of preforms and a cooling fetch method thereof, wherein the external brink of each cooling pipe on the second fetch mechanism is attached precisely with the internal brink of each fetched perform, such that each preform is attached closer to the cooling source for a quick cooling effect, and the internal brink of each perform is attached onto the cooling pipe, such that the bottle mouth of each preform can have a better support to prevent the bottle mouth of each preform from being deformed due to the thermal contraction and expansion, so as to assure the circularity of the bottle mouth and a good airtight when a bottle cap is connected to the bottle mouth of the preform.

Another objective of the present invention is to provide a cooling fetch apparatus of preforms and a cooling fetch method thereof, wherein the first fetch mechanism removes the perform from the mold to the second fetch mechanism for cooling, so that the volume of the first fetch mechanism and the load can be reduced effectively, and the first fetch mechanism can move in a high speed. Therefore, the speed of removing each perform can be quicker, and the overall efficiency of the manufacturing procedure can be improved effectively.

Another objective of the present invention is to provide a cooling fetch apparatus of preforms and a cooling fetch method thereof, wherein the weight carrying capacity of the first fetch mechanism is reduced significantly, and the power source for driving the first fetch mechanism is reduced accordingly, so as to achieve the effects of saving energies and lowering costs.

To achieve the foregoing objectives, the present invention provides a cooling fetch apparatus of performs, and the apparatus is installed on a side of an injection molding machine for fetching performs formed by a mold of the injection molding machine, and the cooling fetch apparatus of performs comprises:

a first fetch mechanism, having a first transmission arm and a first clamp portion, and the transmission arm being moved back and forth, and the first clamp portion being disposed at an end of the transmission arm and moved synchronously with the first transmission arm, and the first fetch mechanism using the first clamp portion to fetch each perform formed by a mold of the injection molding machine from the mold, and the first clamp portion performing a cooling effect of a first stage to the preform external brink, and after each perform is removed from the injection molding machine, an injection molding process is performed to the perform and the first fetch mechanism is ready for the next fetching process;

a second fetch mechanism, having a second transmission arm and a second clamp portion, and the second transmission arm being moved back and forth, and the second clamp portion being disposed at an end of the second transmission arm, and moving synchronously with the second transmission arm, and the second fetch mechanism using the second clamp portion to fetch each perform on the first clamp portion of the first fetch mechanism, such that when the first clamp portion of the first fetch mechanism and the second clamp portion of the second fetch mechanism simultaneously fetch each perform, a cooling effect of a second stage is performed to the internal brink, and a cooling effect of a third stage is performed continuously to the internal brink of each perform, and after the second clamp portion fetches a predetermined quantity of performs, the second clamp portion sequentially unload the performs one by one on the second clamp portion.

DETAILED DESCRIPTION OF THE PREFERRED EMBODIMENTS

Figure 1:
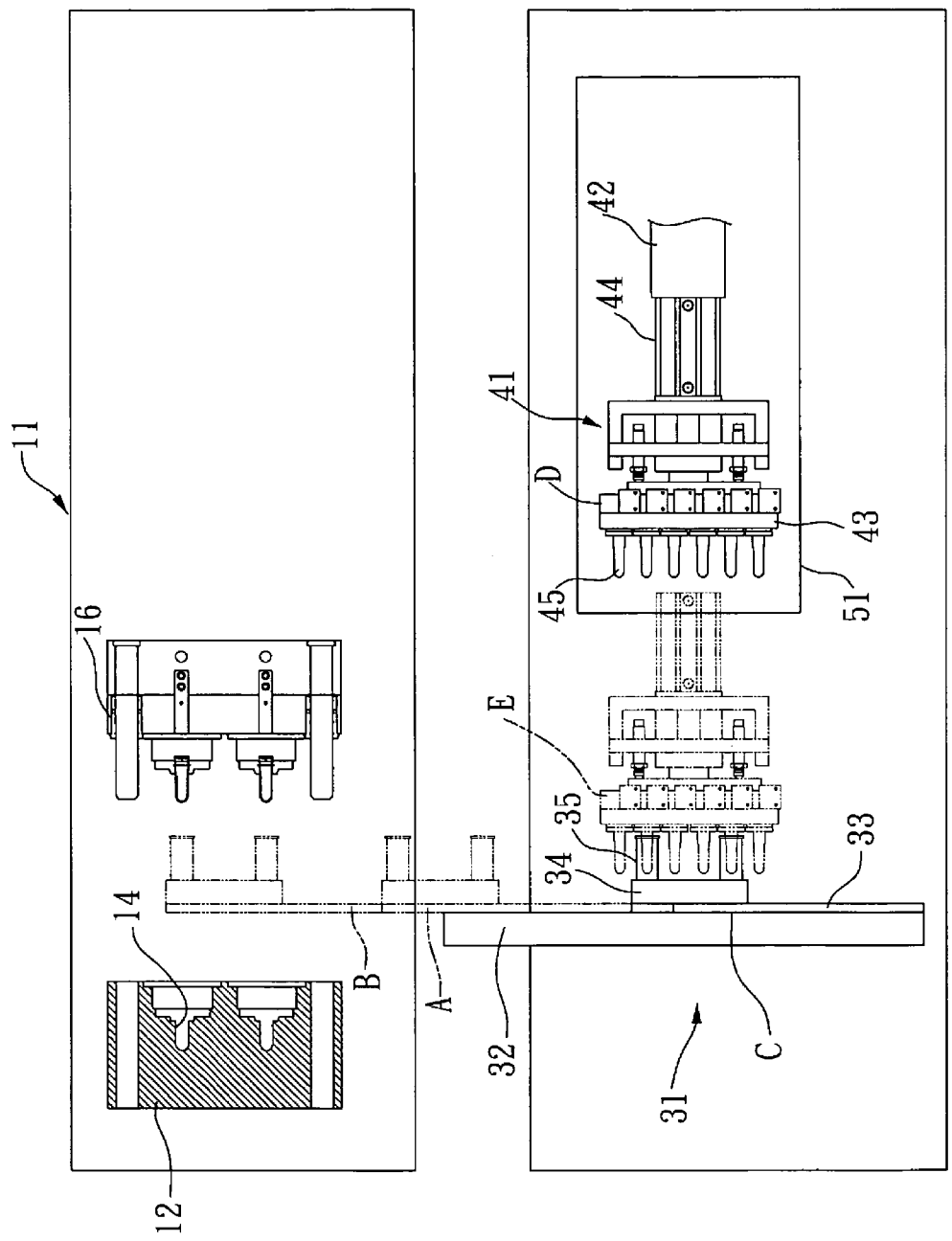
FIG. 1 is a top view of the present invention.
Figure 2:
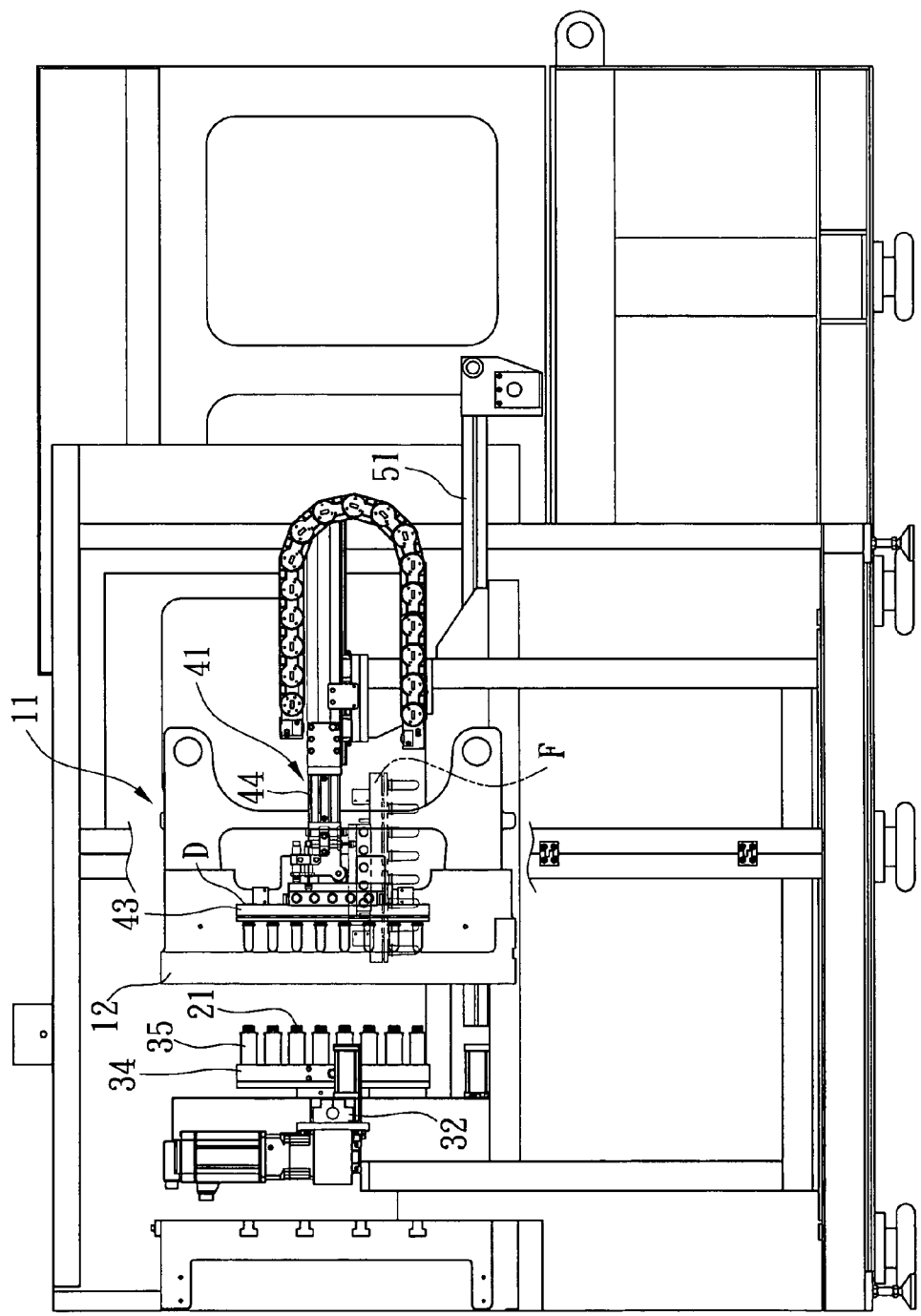
FIG. 2 is a front view of the present invention.

The objective, technical measures and performance of the present invention will become apparent in the detailed description of the preferred embodiments with reference to the accompanying drawings as follows:

Referring to FIGS. 1 and 2 for a cooling fetch apparatus of performs in accordance with the present invention, the apparatus is installed on a side of an injection molding machine 11, and the injection molding machine 11 has a mold 12 that can be clamped and opened repeatedly. The clamped mold 12 forms a plurality of airtight mold cavities 14 provided for injecting a melted plastic liquid into the mold cavities 14, forming a plurality of performs 21 after a shaping time, and removing the performs 21 from the mold 12 by the cooling fetch apparatus of the invention after the mold 12 is opened. The cooling fetch apparatus comprises a first fetch mechanism 31 and a second fetch mechanism 41.

The first fetch mechanism 31 includes a rail 32, a first transmission arm 33 and a first clamp portion 34, and the first transmission arm 33 can be moved back and forth along the rail 32 at a start position A, a target position B and a cooling position C, wherein the target position B is situated in the mold 12, and the cooling position C is situated at a corresponding side of the second fetch mechanism 41, and the start position A is situated between the target position B and the cooling position C. In this embodiment, the start position A is adjacent to a side of the mold 12, such that if the mold 12 has not been formed by injection molding, the first clamp portion 34 will be situated at the start position A to wait for the time of opening the mold 12, and the first clamp portion 34 is situated at an end of the first transmission arm 33 for synchronously moving the first transmission arm 33.

Figure 3:
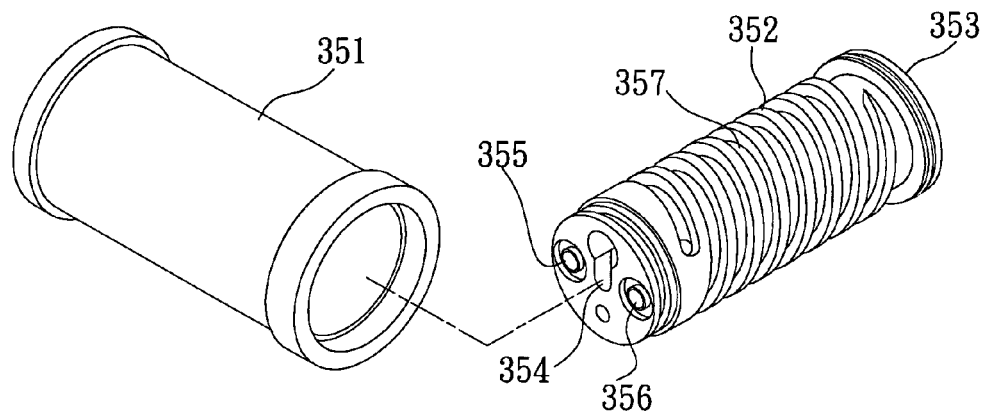
FIG. 3 is an exploded view of a preform suction pipe of the present invention.
Figure 4:
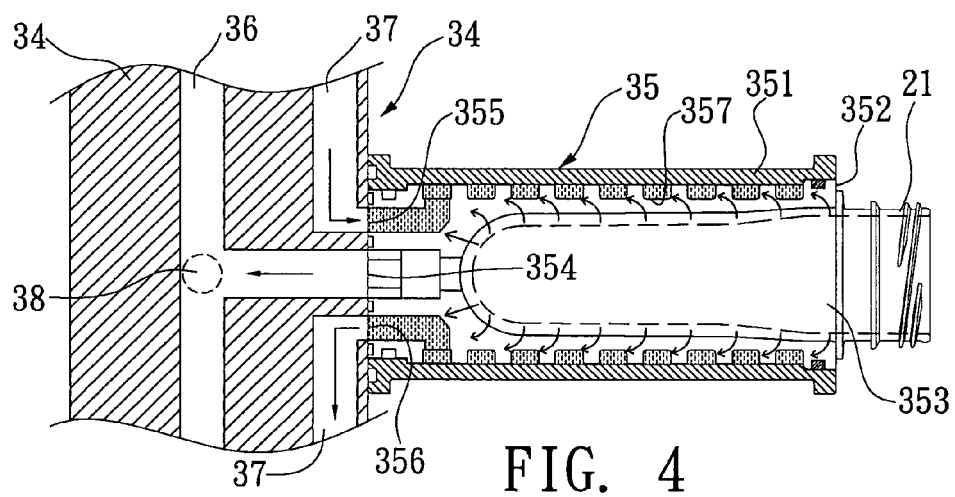
FIG. 4 is a schematic view of a first clamp portion of the present invention.

In FIGS. 3 and 4, the first clamp portion 34 includes a plurality of preform suction pipes 35, a first channel 36 and a second channel 37, and the first channel 36 is connected to a first air nozzle 38 for sucking air, and the second channel 37 is provided for circulating a cooling liquid, and each preform suction pipe 35 is sheathed with onto a built-in element 352 by a sleeve 351, and an end of the built-in element 352 has an opening 353 for accommodating the preform 21, and another end of the built-in element has an air hole 354, a water inlet hole 355 and a water outlet 356, and an end of the air hole 354 is interconnected to the first channel 36, and another end of the air hole 354 is interconnected to the opening 353 of the built-in element 352, and the built-in element 352 has a spiral groove 357 disposed around an external brink of the built-in element 352, and the ends of the water inlet 355 and the water outlet 356 are interconnected to the second channel 37 respectively, and other ends of the water inlet 355 and the water outlet 356 are interconnected to the spiral groove 357, such that the cooling liquid circulated in the second channel 37 will enter from the water inlet 355 into the spiral groove 357 at the external brink of the built-in element 352, and flow out from the water outlet 356.

When the mold 12 of the injection molding machine 11 is opened, the first transmission arm 33 drives the first clamp portion 34 to move from the start position A to the target position B, and the opening 353 of each preform suction pipe 35 is sheathed and embedded into the preform 21. Now, the vacuum produced by air suction at the first air nozzle 38 results in an airtight attachment of the preform 21 into the opening 353 of each preform suction pipe 35. In the meantime, the cooling effect produced by the cooling liquid circulated in the spiral groove 357 of the preform suction pipe 35 performs a cooling effect of a first stage to an external brink of the preform 21 that are attached to the opening 353 of each preform suction pipe 35, and then the first clamp portion 34 moves the preforms 21 to the cooling position C, and the cooling position C is further divided into a first fetch position C1, a second fetch position C2 and a third fetch position C3. After each preform 21 is removed from the mold 12 of the injection molding machine 11, the injection molding is performed to the preforms 21 again to prepare the first clamp portion 34 of the first fetch mechanism 31 for the next fetch.

Figure 5:
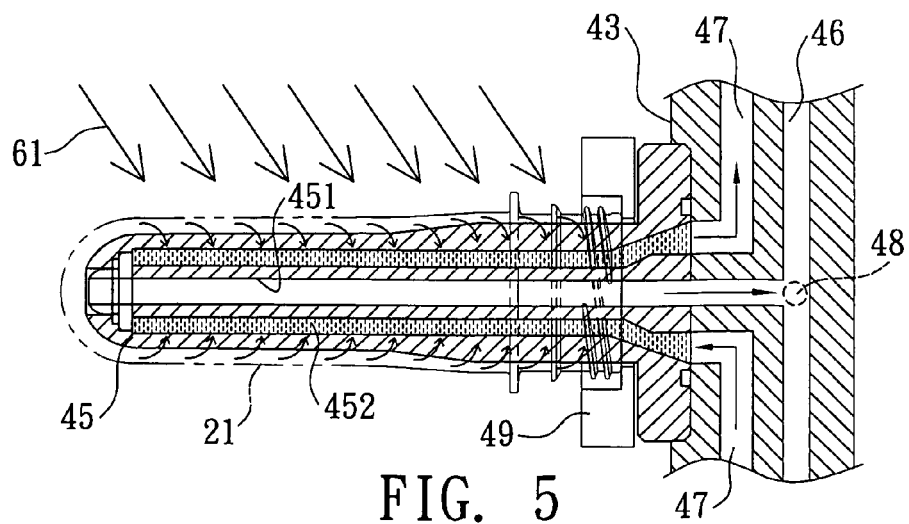
FIG. 5 is a schematic view of a second clamp portion of the present invention.
Figure 18:
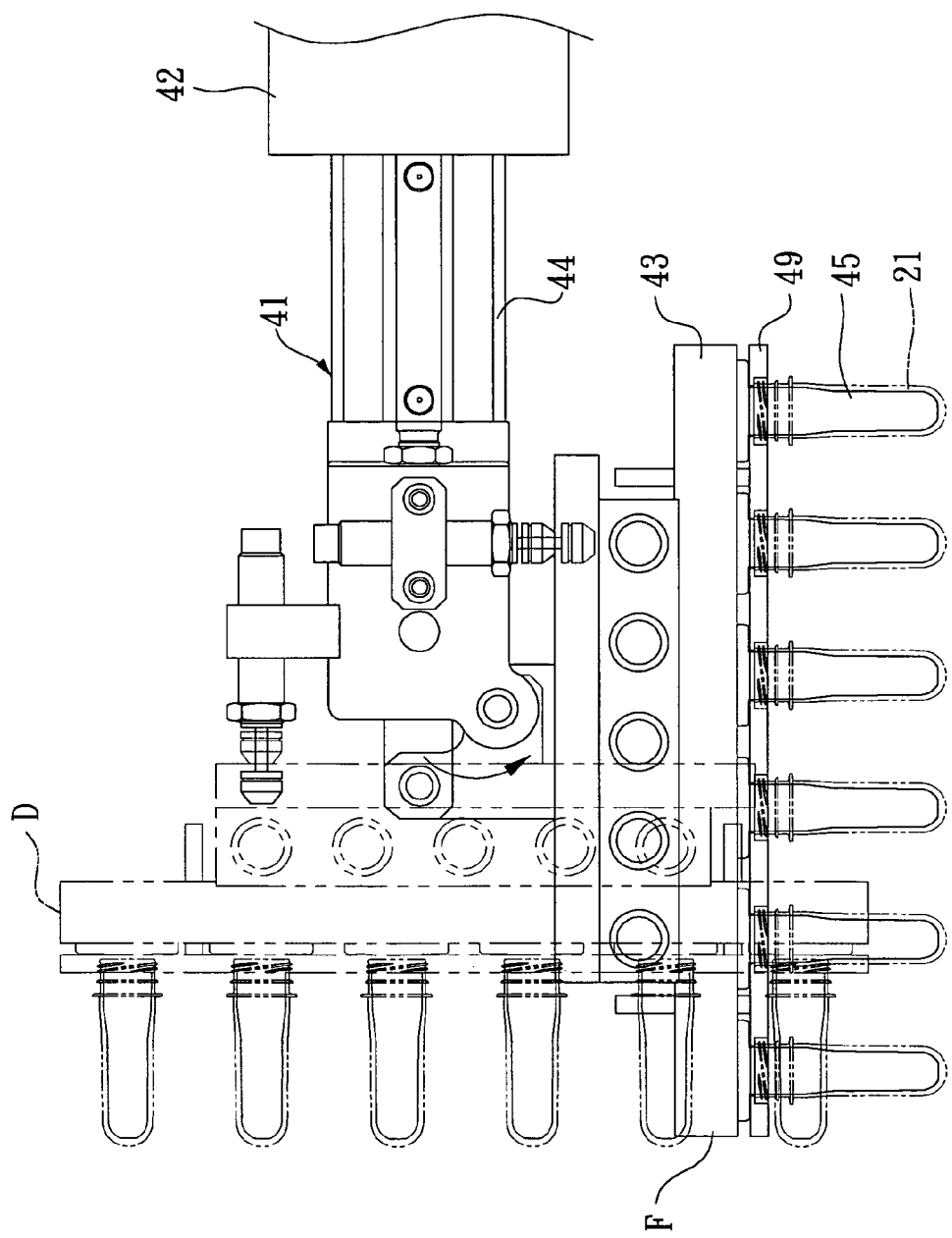

Referring to FIGS. 1 and 2, the second fetch mechanism 41 includes a second transmission arm 42 and a second clamp portion 43, and the second transmission arm 42 can move back and forth between a material collection position D and a material fetch position E, and the second clamp portion 43 is disposed at an end of the second transmission arm 42 and moved synchronously with the second transmission arm 42. Referring to FIG. 5 as well, the second clamp portion 43 includes a plurality of cooling pipes 45 disposed thereon, and the second clamp portion 43 includes a third channel 46 and a fourth channel 47, and the third channel 46 is used for connecting a second air nozzle 48 for performing an air suction, and the fourth channel 47 is provided for a cooling liquid to circulate. In addition, the second clamp portion 43 is pivotally coupled to an end of the second transmission arm 42, so that the second clamp portion 43 can be rotated and moved back and forth between the material collection position D and a material unload position F (as shown in FIG. 18).

Further, the cooling pipes 45 have a penetrating hole 451 along their axes respectively, and the penetrating hole 451 is interconnected with the third channel 46, and the cooling pipe 45 includes a cooling channel 452 disposed therein, and the cooling channel 452 is interconnected with the fourth channel 47, so that the cooling liquid circulated in the fourth channel 47 can be circulated to the cooling channel 452 of the cooling pipe 45, and the shape of the external brink of the cooling pipe 45 corresponds to the shape of the internal brink of the preform 21.

Figure 6:
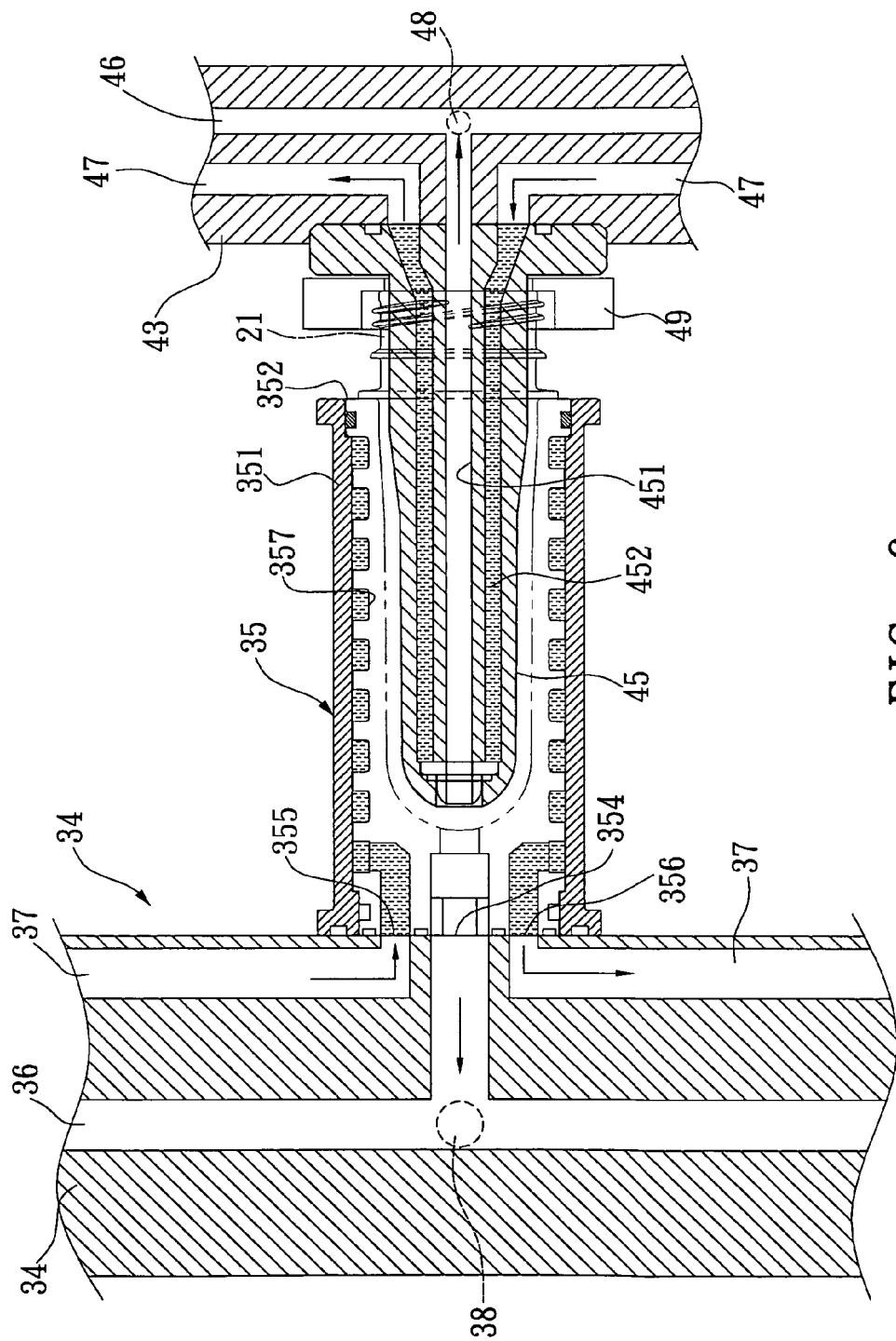
FIG. 6 is a schematic view of the structure of engaging a first clamp portion with a second clamp portion in accordance with the present invention.

When the first clamp portion 34 moves the preforms 21 to a first fetch position C1 of the cooling position C of the first transmission arm 33, the second transmission arm 42 is also moved from the material collection position D to the material fetch position E, and the cooling pipe 45 of the second transmission arm 42 is sheathed and connected with the preform 21 of the first clamp portion 34. As shown in FIG. 6, the first clamp portion 34 and the second clamp portion 43 perform a cooling action of a second stage to the external and internal brinks of each preform 21. Since the external brink of the cooling pipe 45 is attached to the internal brink of the fetched preform 21, the temperature of each preform 21 can be cooled quickly, and each preform 21 produces a contraction due to the cooling effect, so that the internal brink of each preform 21 is attached closer to the cooling source of the cooling pipe 45 to have a better cooling effect. After a predetermined cooling time, the first air nozzle 38 of the first fetch mechanism 31 terminates the air suction, and second air nozzle 48 of the second fetch mechanism 41 starts sucking air instead to produce a vacuum, such that each preform 21 is attached tightly by each cooling pipe 45 of the second clamp portion 43. Now, the second transmission arm 42 is resumed from the material fetch position E to the material collection position D, and the cooling effect produced by the cooling liquid and circulated in the cooling channel 452 of each cooling pipe 45 continues performing a cooling effect of a third stage to the internal brink of the preform 21. Now, the first clamp portion 34 is retracted to the start position A and waits for the injection molding machine 11 to complete the injection molding process of the preforms 21 at the next stage, and uses the first clamp portion 34 of the first fetch mechanism 31 to complete fetching the formed preforms 21, and then the first clamp portion 34 carries the fetched preforms 21 sequentially to the second fetch position C2 and the third fetch position C3 for the fetch by the second fetch mechanism 41.

After a predetermined quantity of performs 21 are fetched sequentially by the second clamp portion 43 of the second fetch mechanism 41, the second clamp portion 43 is rotated from the material collection position D to the material unload position F by a revolving cylinder 44. Now, the second air nozzle 48 stops sucking air and the second clamp portion 43 at a corresponding cooling position C of the first clamp portion 34 is pushed by an ejecting element 49, and the cooled preforms 21 fetched by the first fetch position C1 are removed sequentially in batches. It is noteworthy to point out that vacuum loop design comprised of the first air nozzle 38 and the second air nozzle 48 is a prior art structure, and thus its structure will not be described here.

The conveying mechanism 51 is installed at the bottom of the second fetch mechanism 41, and the conveying mechanism 51 of this embodiment is a conveyor belt structure provided for carrying the cooled preform 21 removed by the second clamp portion 43 of the second fetch mechanism 41 to a next manufacturing process.

To improve the cooling speed of the preforms 21, a demister (not shown in the figure) can be installed next to the second fetch mechanism 41 for blowing cool air 61 (as shown in FIG. 5) to expedite the cooling speed of each preform 21 on the second clamp portion 43 of the second fetch mechanism 41. The demister is a prior art structure and not a key characteristic of the present invention, and thus the whole structure of the demister will not be described in details here.

Figure 7:
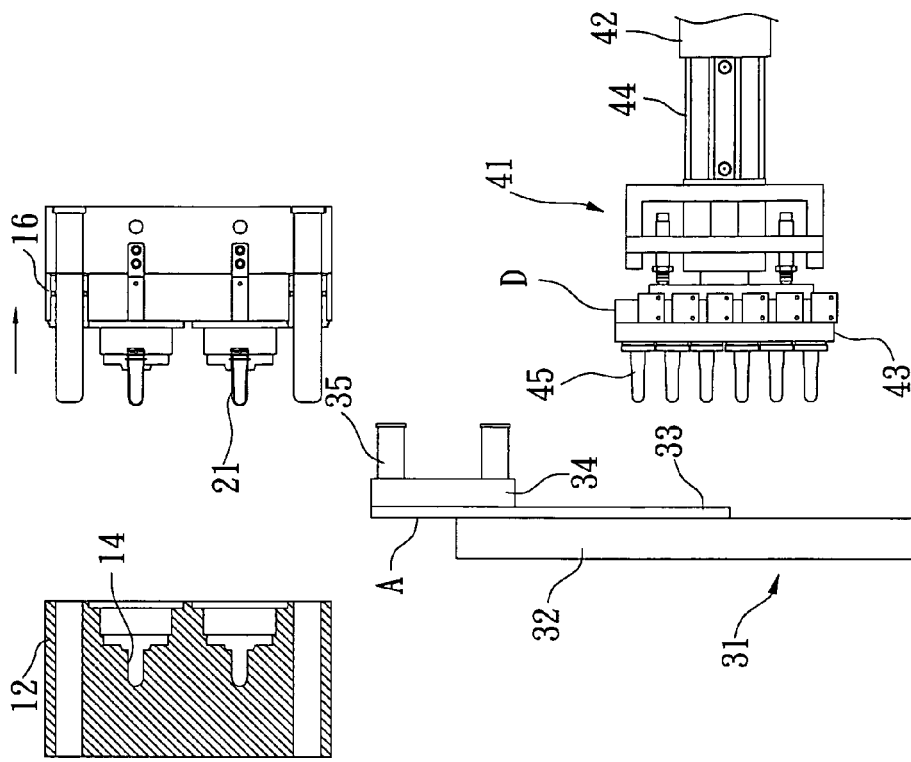
FIGS. 7 to 29 for flow charts of a preform cooling fetch method of the present invention.
Figure 8:
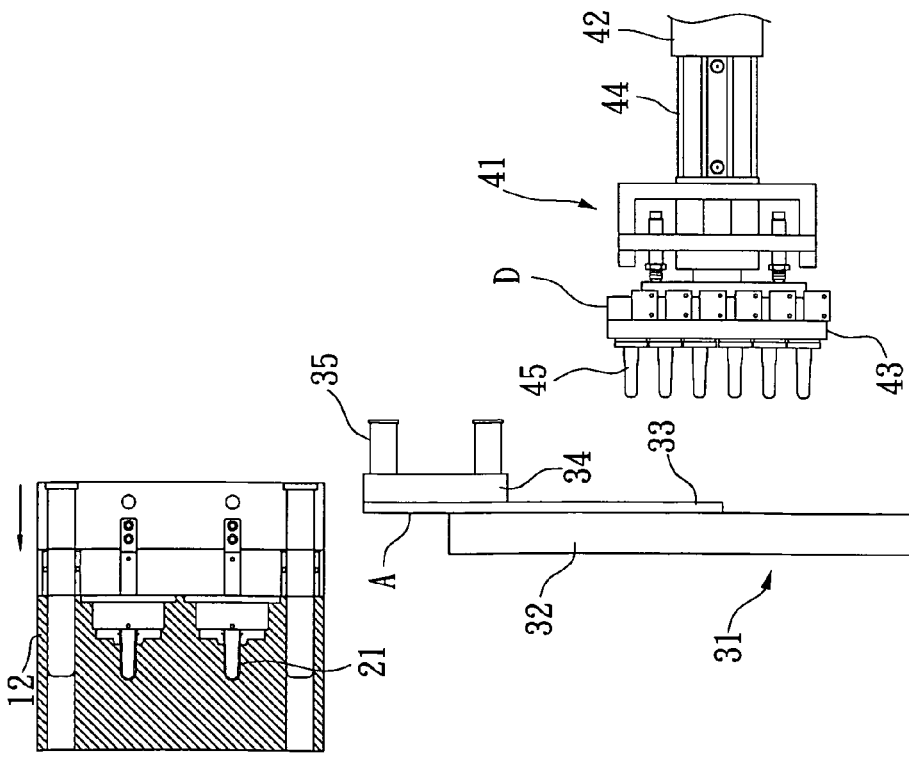
Figure 10:
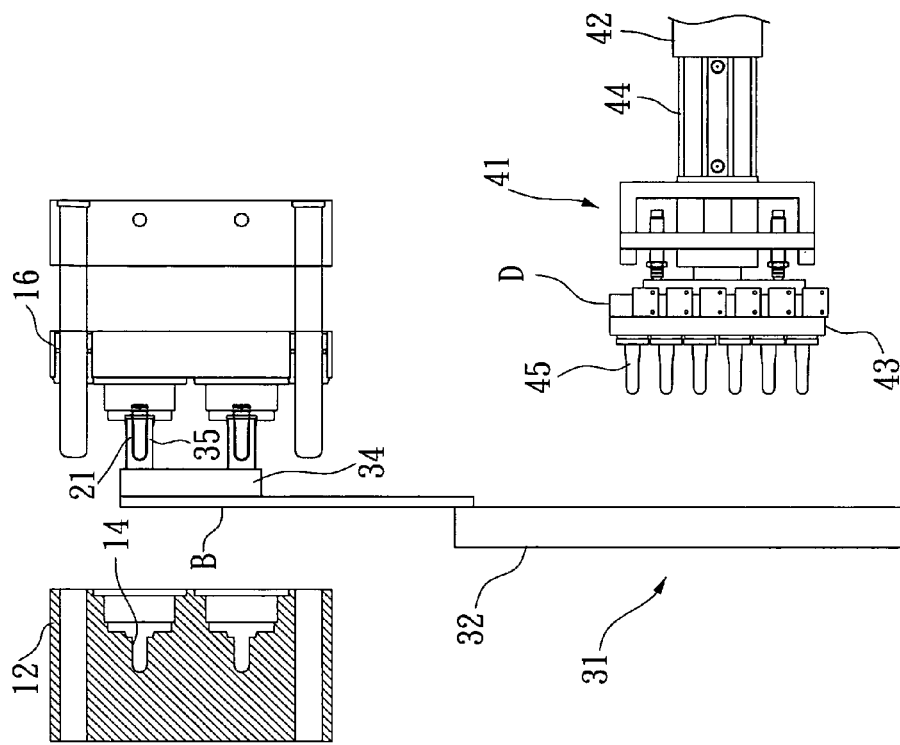
Figure 9:
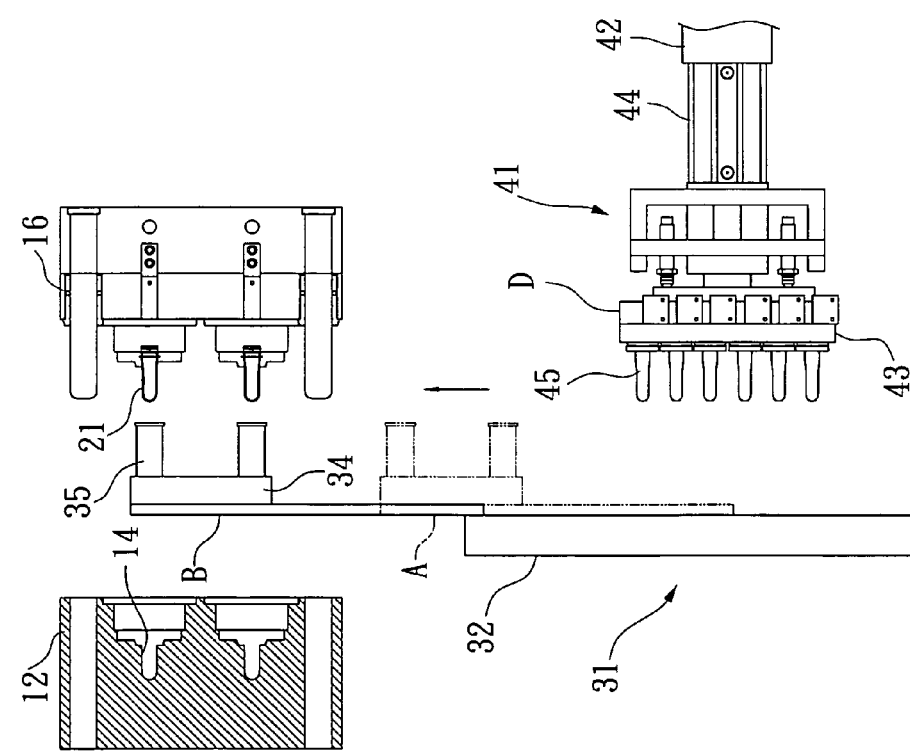
Figure 11:
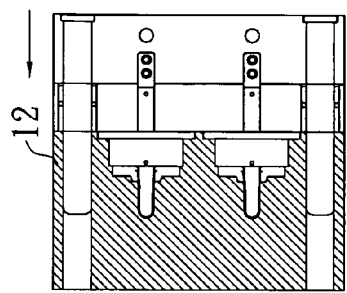
Figure 11:
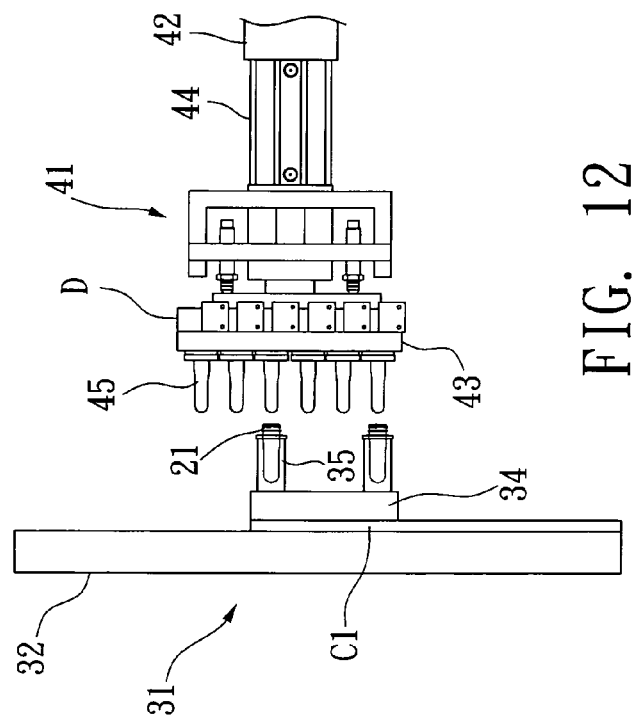
Figure 12:
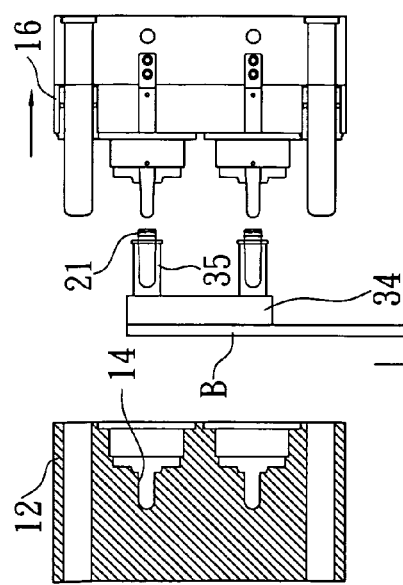
Figure 12:
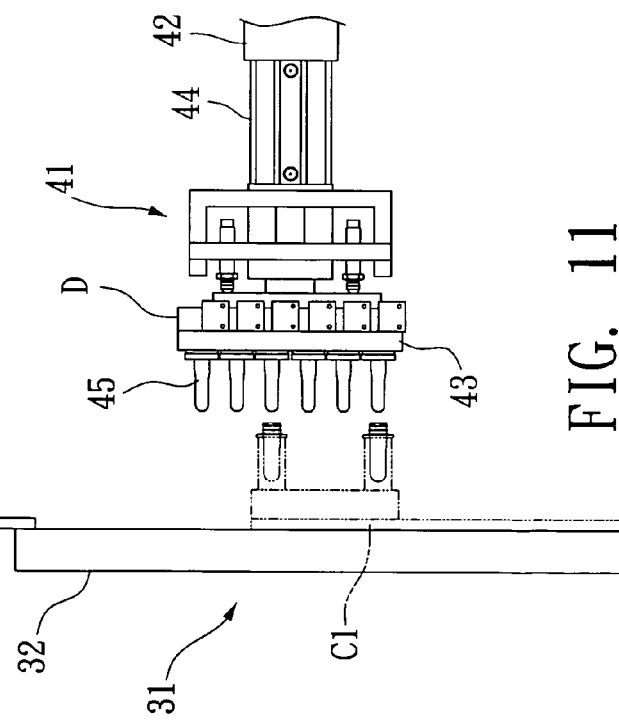
Figure 15:
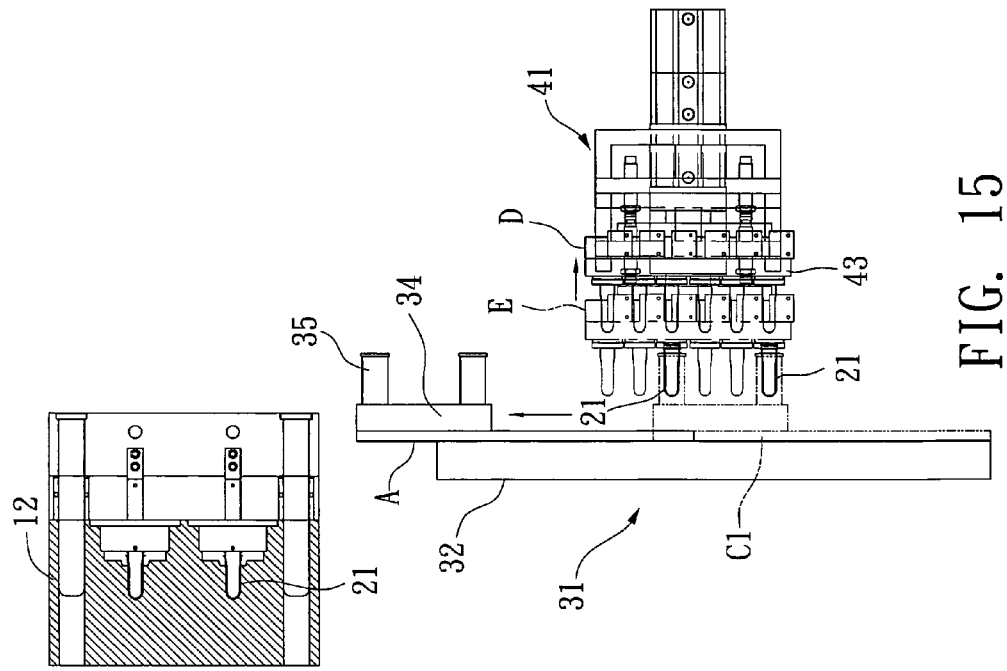
Figure 13:
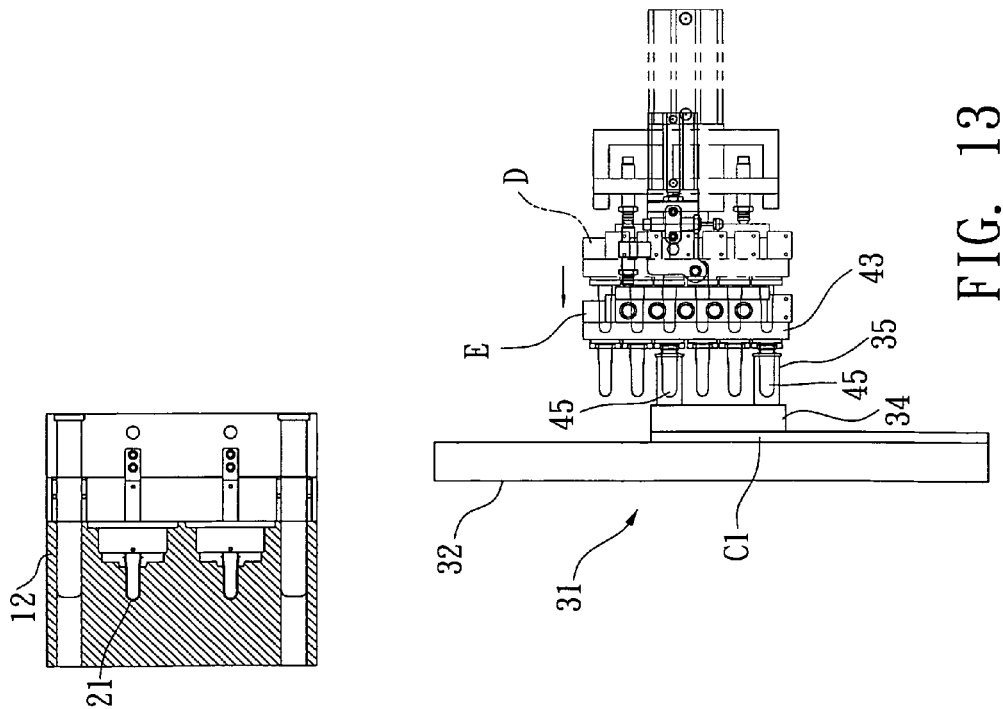
Figure 14:
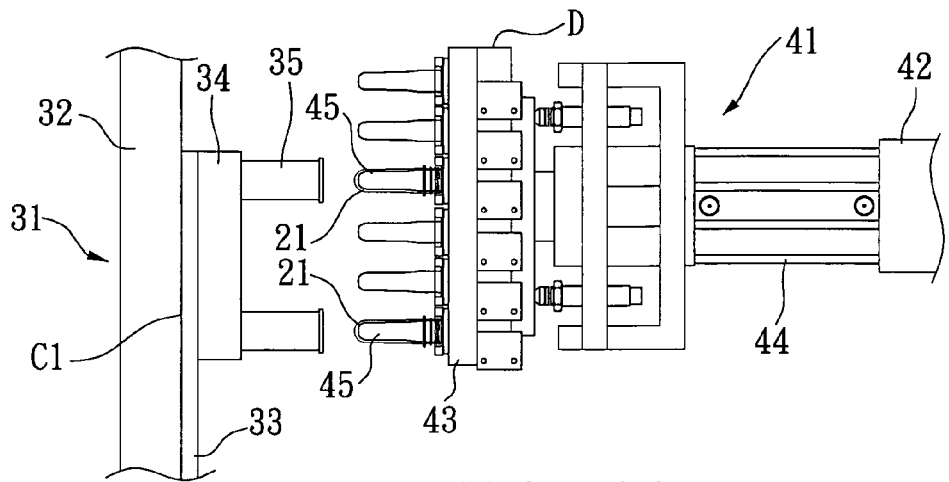
Figure 16:
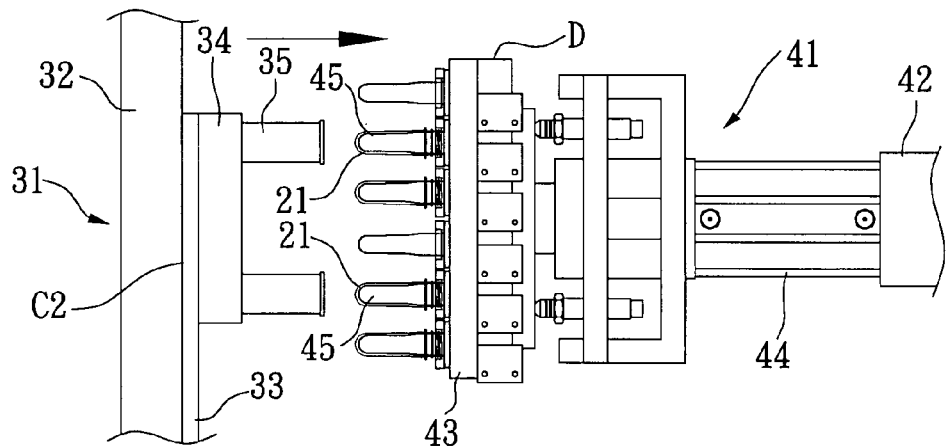
Figure 17:
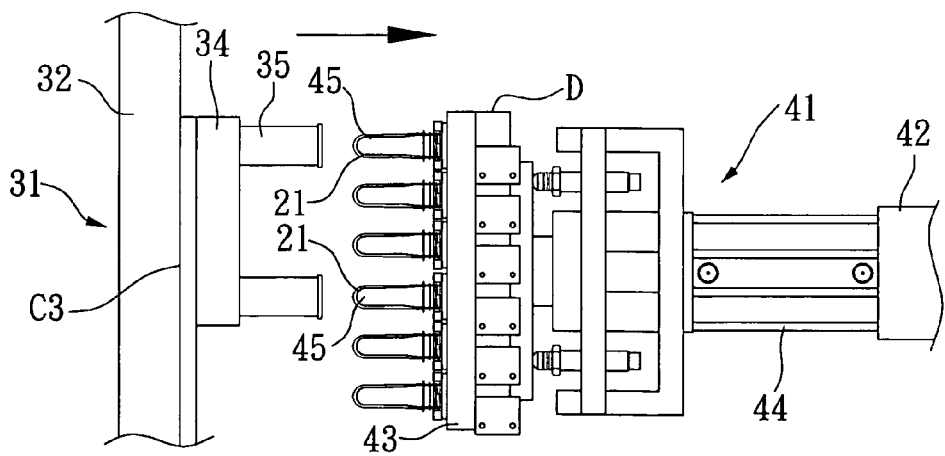
Figure 19:
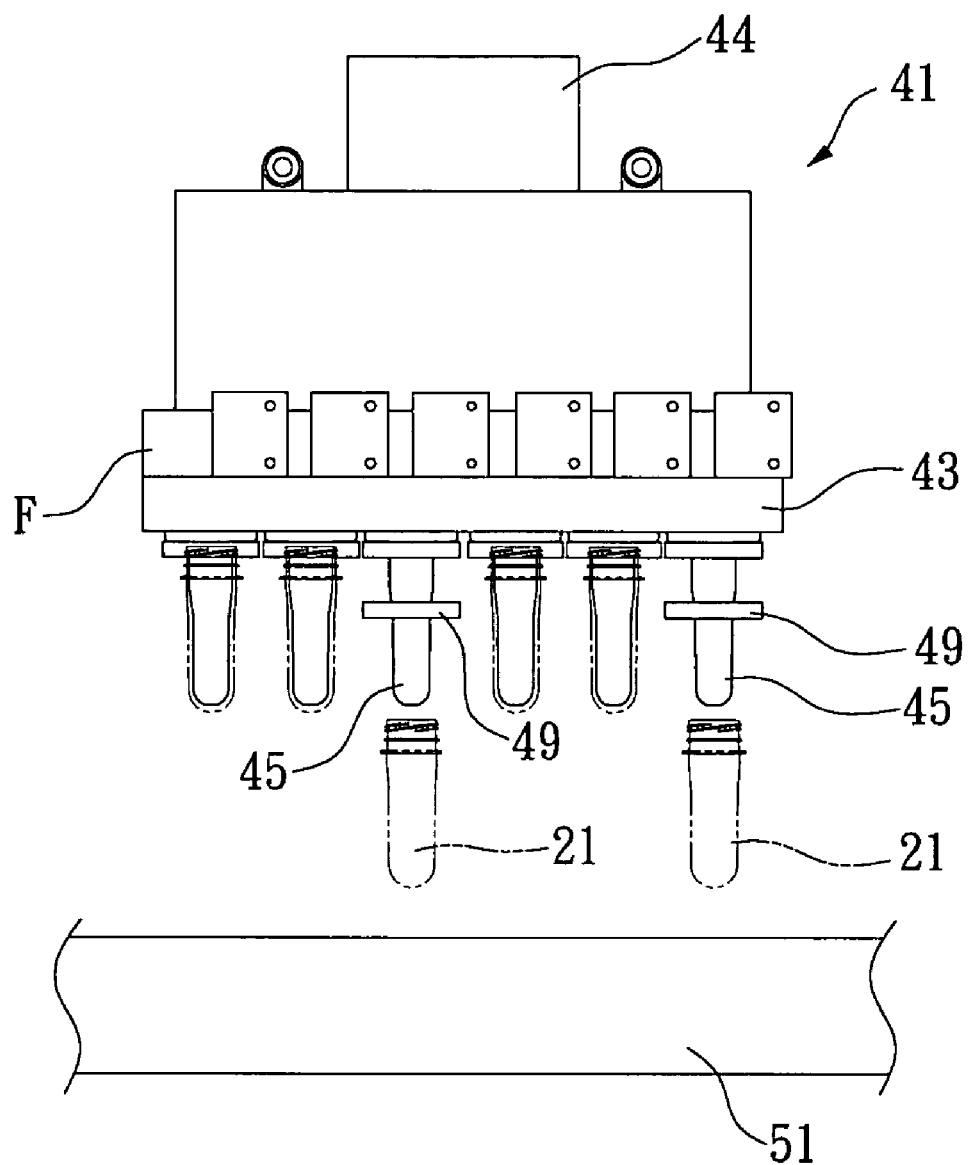
Figure 21:
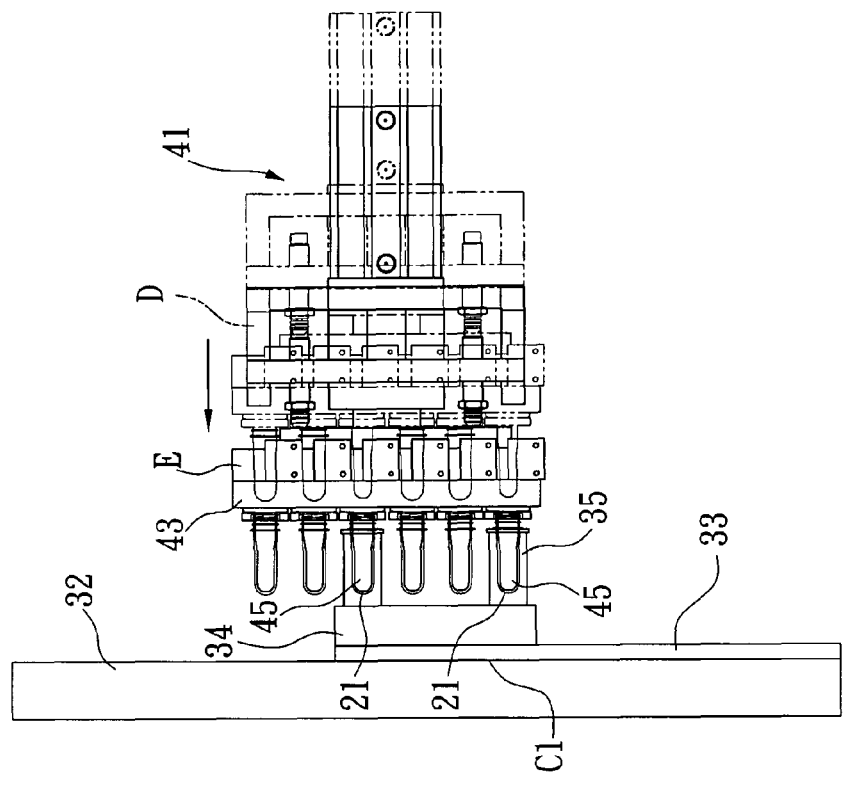
Figure 20:
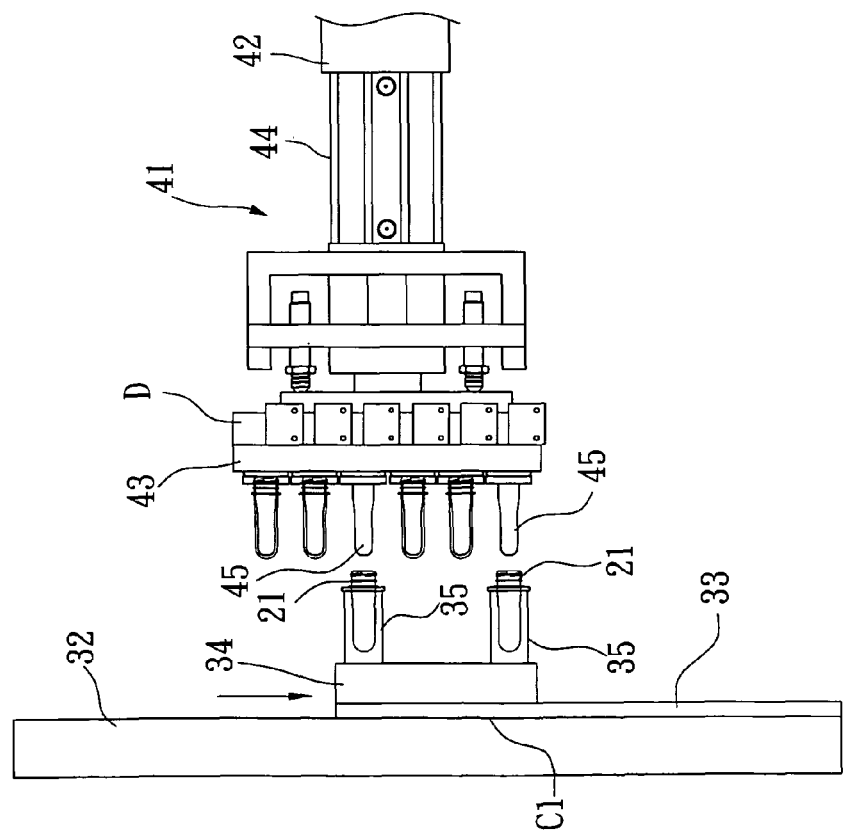
Figure 22:
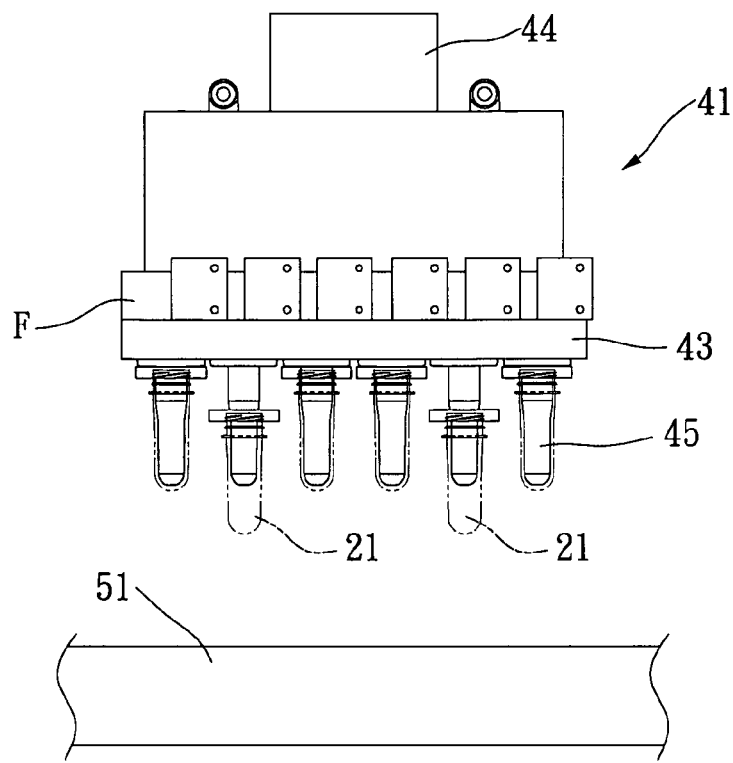
Figure 23:
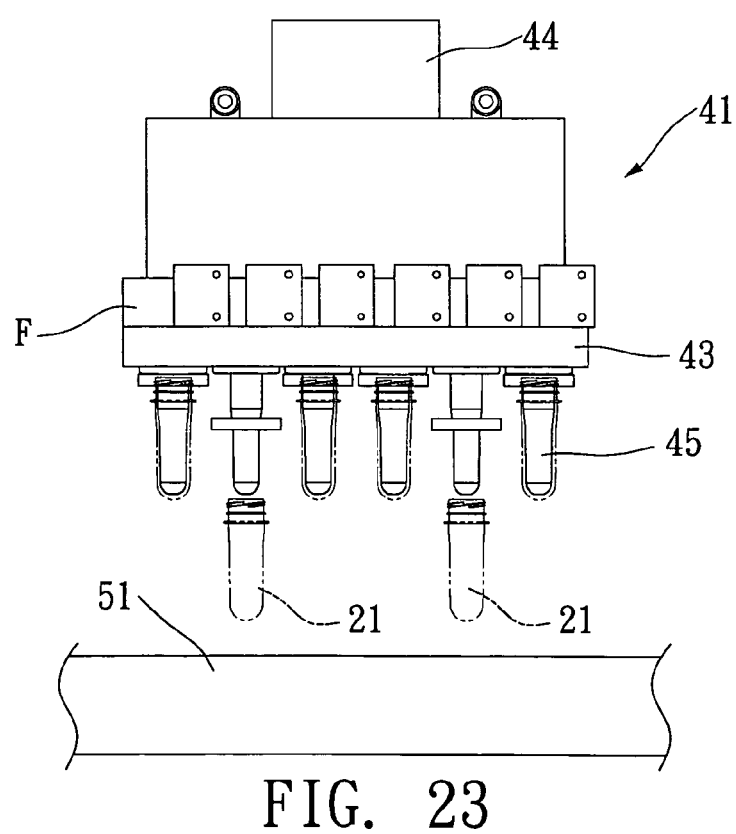
Figure 25:
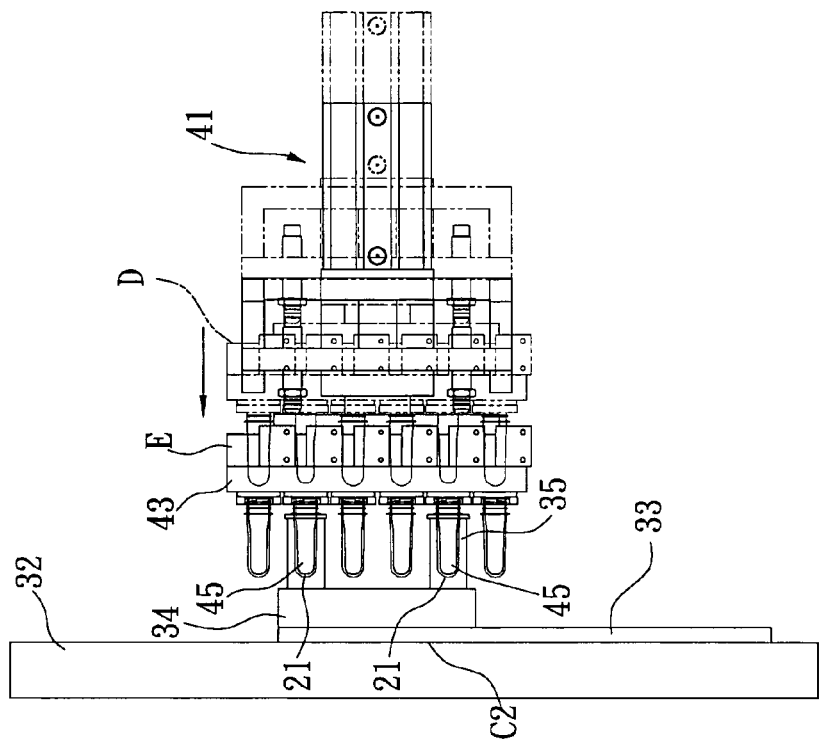
Figure 24:
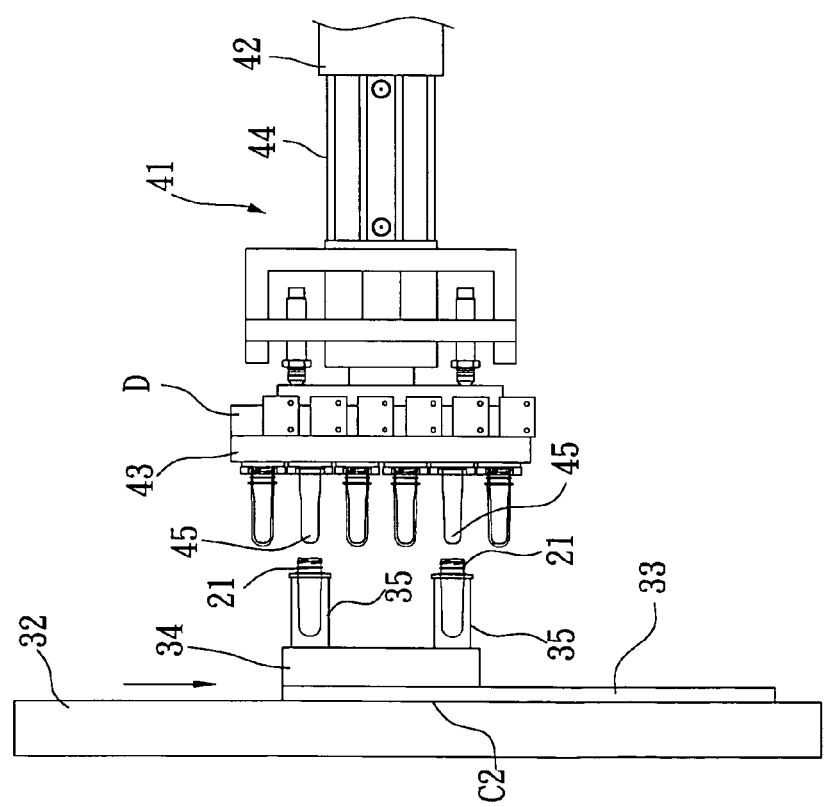
Figure 26:
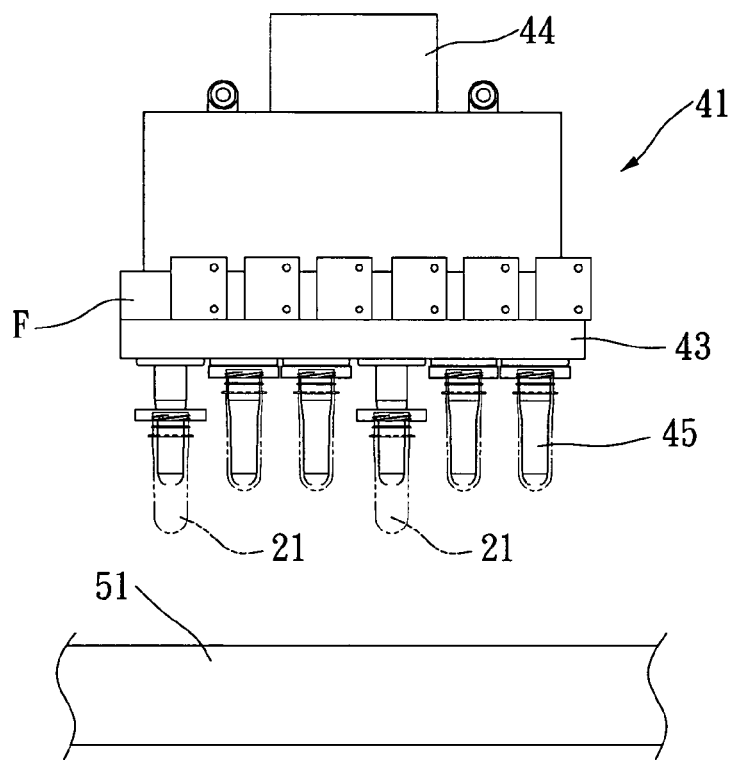
Figure 27:
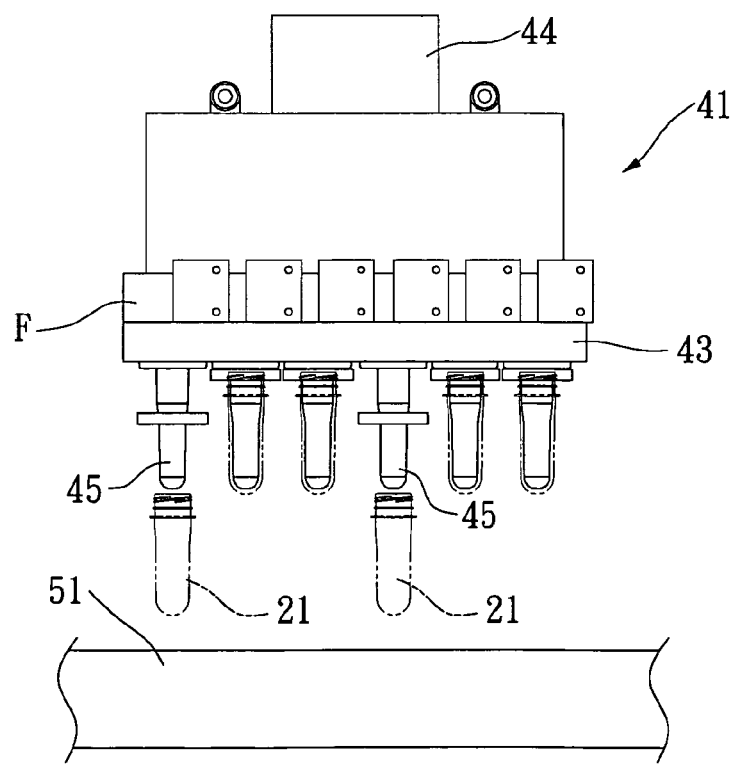
Figure 29:
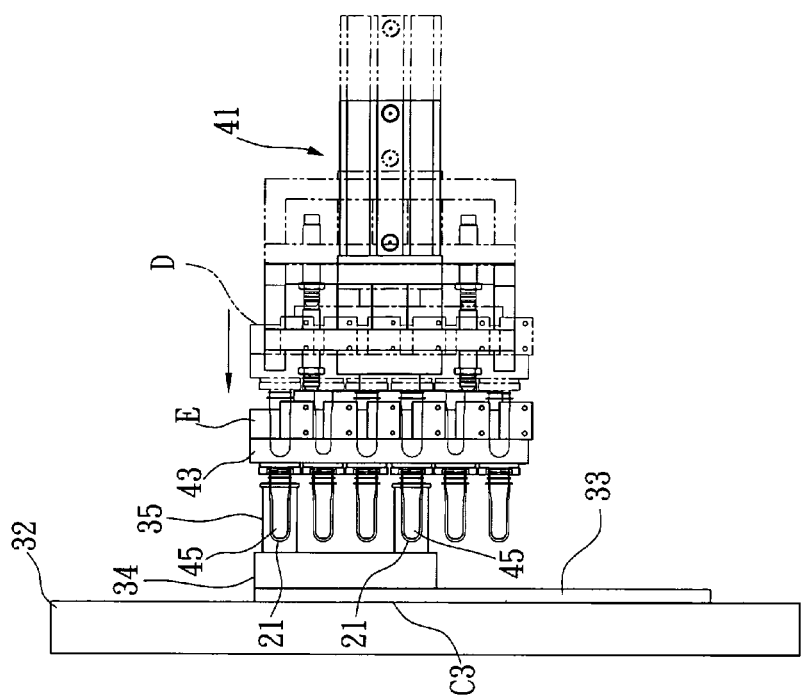
Figure 28:
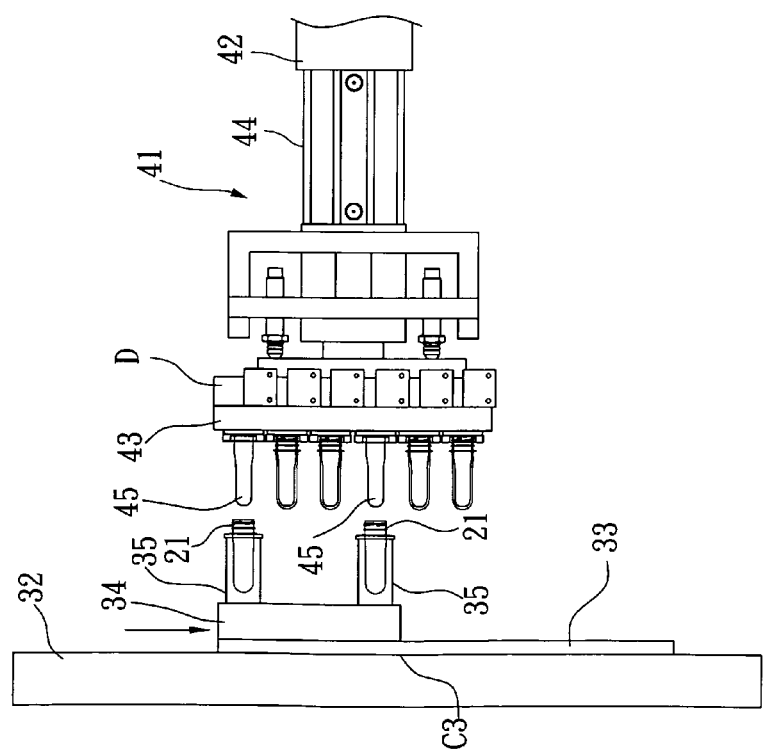
Figure 32:
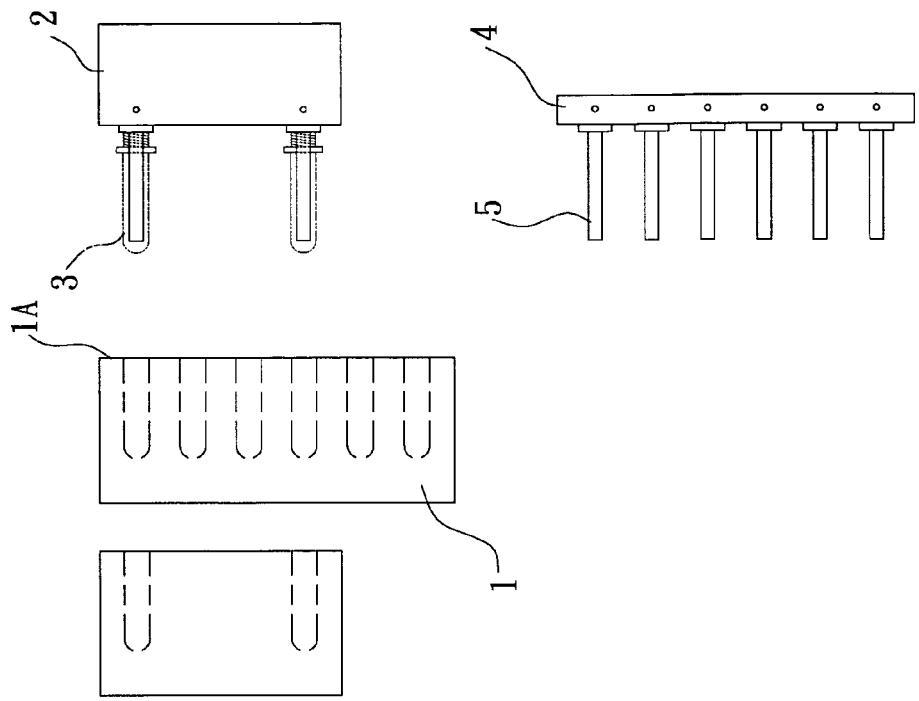
FIG. 32 is a schematic view of fetching a perform of a traditional preform cooling device, showing a state of a clamping arm at a first fetch position and preparing for the fetch of a perform.
Figure 30:
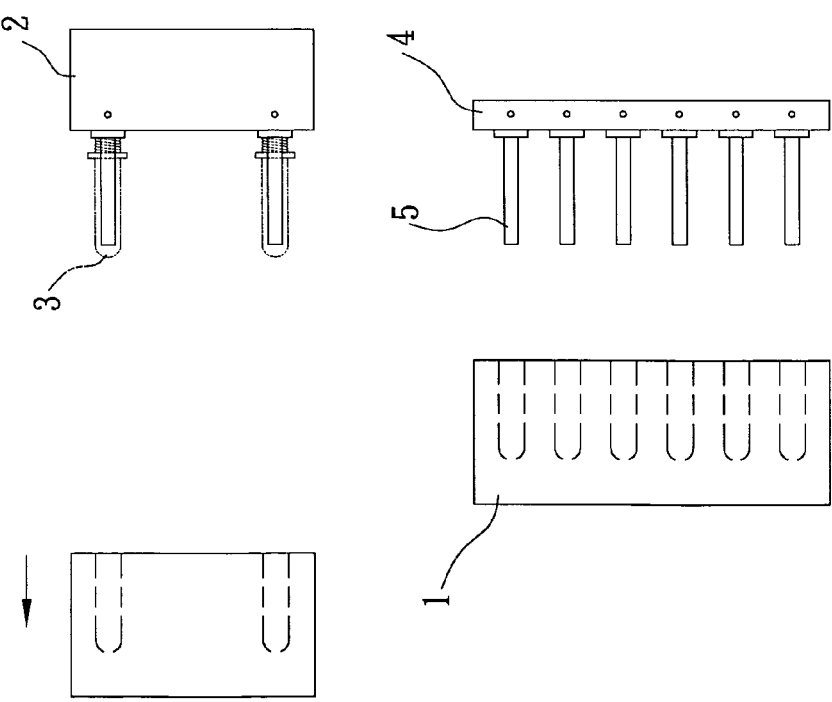
FIG. 30 is a schematic view of a traditional preform cooling device.
Figure 31:
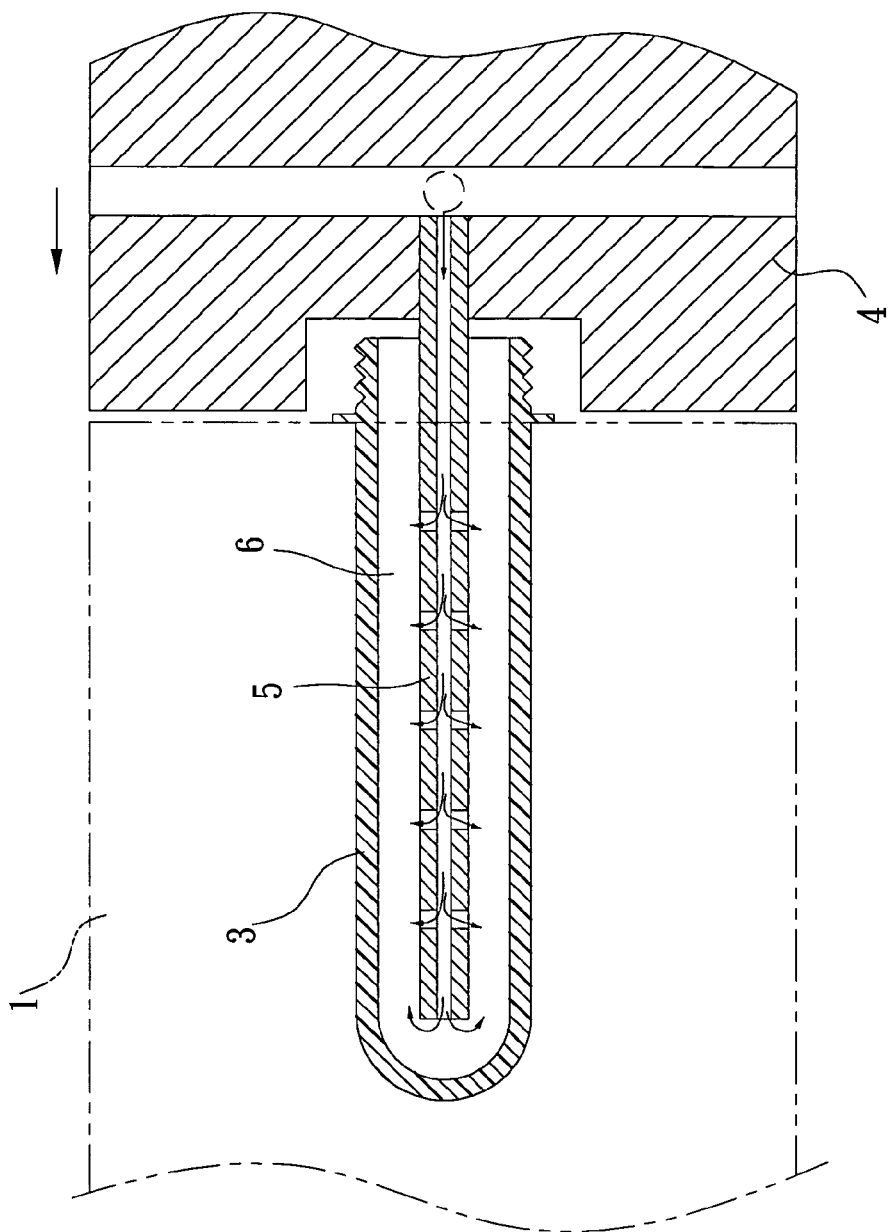
FIG. 31 is an enlarged view of a portion of a traditional preform cooling device in a cooling process.
Figure 34:
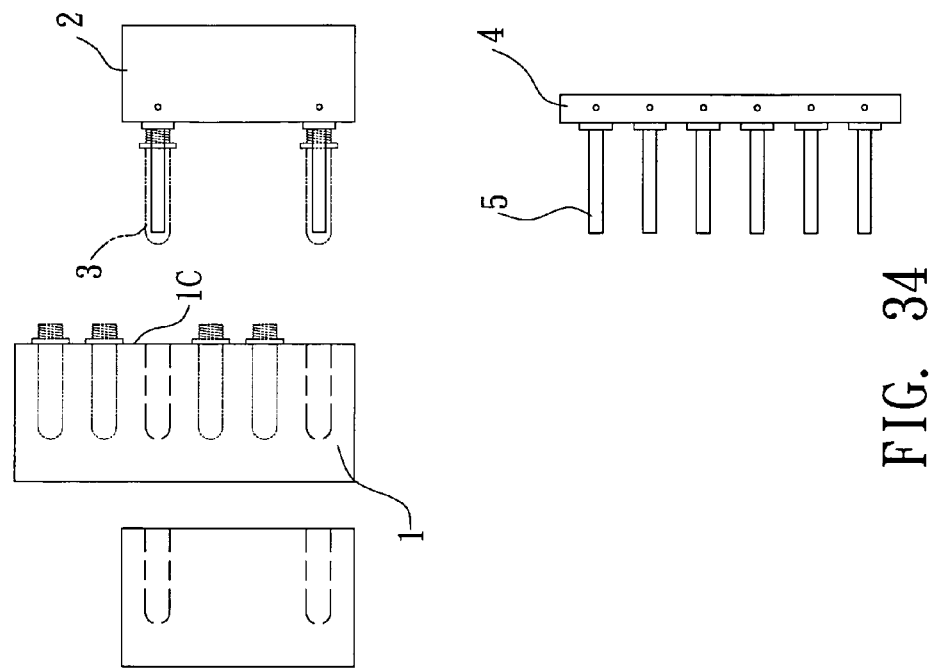
FIG. 34 is a schematic view of fetching a perform of a traditional preform cooling device, showing a state of a clamping arm at a third fetch position, and preparing for the fetch of a perform.
Figure 33:
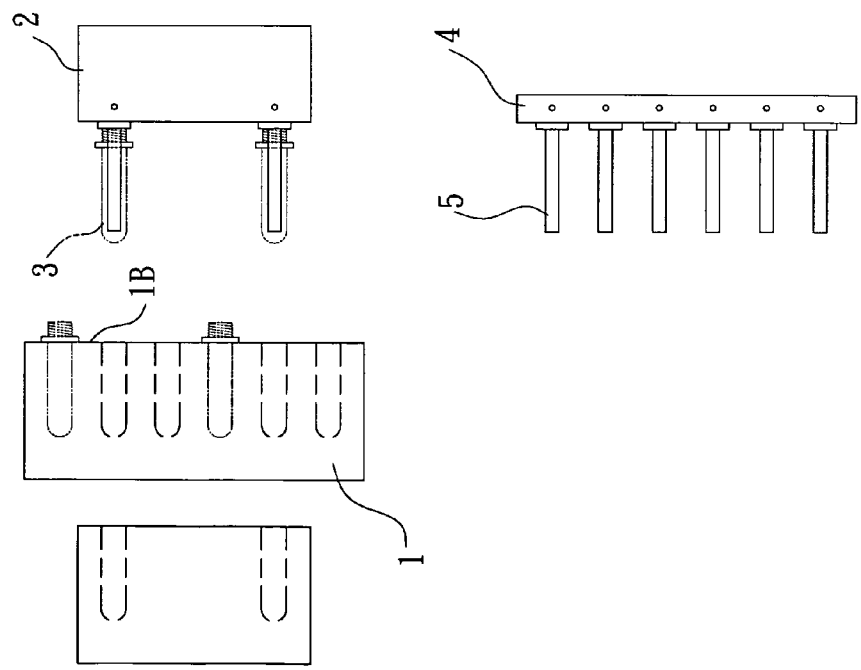
FIG. 33 is a schematic view of fetching a perform of a traditional preform cooling device, showing a state of a clamping arm at a second fetch position, and preparing for the fetch of a perform.

Referring to FIGS. 7 to 29 for a cooling fetch method adopting the aforementioned elements in accordance with the present invention, the method comprises the steps of:

(a) clamping the mold 12 of the injection molding machine 11, and performing an injection molding operation to each preform 21 in each mold cavity 14 (as shown in FIG. 7);

(b) opening the mold 12 of the injection molding machine 11 after a predetermined shaping time, and forming a plurality of finished goods of the high-temperature preform 21 (as shown in FIG. 8);

(c) moving the first clamp portion 34 of the first fetch mechanism 31 from the start position A to the target position B (as shown in FIG. 9) and entering into the opened mold 12, such that an ejecting mold 16 in the mold 12 pushes the preforms 21 in a direction towards the first clamp portion 34, and the preforms 21 is accommodated precisely in each preform suction pipe 35 of the first clamp portion 34, and the sucking vacuum produced by the first air nozzle 38 in the first clamp portion 34 fetches the preforms 21 onto the first clamp portion 34 (as shown in FIG. 10);

(d) moving the first clamp portion 34 of the first fetch mechanism 31 from the target position B to a first fetch position C1 of the cooling position C, such that each preform 21 is moved out of the mold 12, and the first clamp portion 34 of the first fetch mechanism 31 preforms a cooling effect of a first stage to the external brink of the preforms 21 by the circulated cooling liquid, and after the first fetch mechanism 31 removes the preforms 21 from the mold 12, the injection molding machine 11 closes the mold 21 to perform the injection molding manufacture process for the next stage (as shown in FIGS. 11 and 12);

(e) moving the second clamp portion 43 of the second fetch mechanism 41 from the material collection position D to the material fetch position E, and connecting to each preform 21 on the first clamp portion 34, such that the first clamp portion 3 and the second clamp portion 43 perform the cooling action of a second stage to the internal brink of each preform 21 (as shown in FIG. 13), and after a predetermined cooling time, the second clamp portion 43 carries the preforms 21 from the material fetch position E to the material collection position D (as shown in FIG. 14), and by then the second clamp portion 43 of the second fetch mechanism 41 continues performing the cooling action of a third stage to the internal brink of each preform 21, and the first clamp portion 34 is resumed from the first fetch position C1 to the start position A to wait for the injection molding machine 11 to complete the injection molding of preforms 21 at the next stage, and then use the first clamp portion 34 of the first fetch mechanism 31 to continue completing the fetching of each molded preform 21 (as shown in FIG. 15);

(f) repeating Steps B to E, wherein the first clamp portion 34 carries each preform 21 to the second fetch position C2, and then uses the second clamp portion 43 to fetch each preform 21 (as shown in FIG. 16), and the first clamp portion 34 carries each preform 21 from the mold 12 to the third fetch position C3 for fetching the second clamp portion 43, and the second clamp portion 43 fetches a predetermined quantity of preforms 21 (as shown in FIG. 17);

(g) moving the second clamp portion 43 of the second fetch mechanism 41 from the material collection position D to the material unload position F by a revolving cylinder 44 for unloading the material (as shown in FIG. 18), and then removing a portion of preforms 21 from the second clamp portion 43 (wherein this embodiment remove each preform 21 on the first and fourth rows of cooling pipes first as shown in FIG. 19);

(h) using an output mechanism 51 to retain the cooled preforms 21 removed from the second clamp portion 43, and outputting the preforms 21 (as shown in FIG. 19);

(i) repeating Steps B to E, wherein the first clamp portion 34 is moved to the first fetch position C1 again, and the second clamp portion 43 removes a portion of preforms 21 fetched by the first clamp portion 34 as described in Step (g) (wherein if the first clamp portion 34 is moved to the first fetch position C1 in accordance with this embodiment, the preforms 21 on the first clamp portion 34 correspond to the first and fourth rows of cooling pipes of the second clamp portion 43, for fetching the preforms 21 disposed on the first clamp portion 34 as shown in FIGS. 20 and 21);

(j) moving the second clamp portion 43 of the second fetch mechanism 41 from the material collection position D to the material unload position F for unloading the material, and removing a portion of preforms 21 from the second clamp portion 43 onto the conveying mechanism 51 (wherein this embodiment uses the second and fifth rows of cooling pipes to remove the performs (as shown in FIGS. 22 and 23);

(k) moving each preform 21 fetched by the first clamp portion 34 from the mold 12 to the second fetch position C2 in this embodiment, such that the preforms 21 on the first clamp portion 34 correspond to the second and fifth rows of cooling pipes 45 on the second clamp portion 43 to fetch each preform 21 onto the second clamp portion 43 (as shown in FIGS. 24 and 25), and unload the performs 21 from the third and sixth rows of the cooling pipes 45 on the second clamp portion 43 (as shown in FIGS. 26 and 27), and when the first clamp portion 34 carries the preforms 21 to the third fetch position C3, each preform 21 on the first clamp portion 34 correspond to the third and sixth rows of cooling pipes 45 on the second clamp portion 43, and each preform 21 is fetched onto the second clamp portion 43 (as shown in FIGS. 28 and 29).

Steps (i) to (k) are repeated according to the principle of the invention, so that the preforms 21 on the second fetch mechanism 41 can be removed sequentially in batches. Since the fetched preform 21 will not be removed immediately, therefore the cooling time of the preforms 21 situated on the second fetch mechanism 41 is extended to achieve a better cooling effect.

In addition, the method of fetching performs in accordance with the present invention is not limited to the method having a cooling effect at three stages, but the method of the invention can be used for a cooling effective at four or more stages for the performs fetched in batches according to the quantity of performs carried by the second fetch mechanism 41.

Before the invention is put into practice, and the injection molding machine 11 carries out the injection molding operation of a first time, there are impurities remained in the mold cavities 14 of the mold 12 from the previous operation, and thus the preforms 21 produced by the injection molding machine 11 for the first time of injection molding are discarded in order to prevent affecting the overall yield rate of the manufacturing procedure.

With the cooling fetch apparatus and the cooling fetch method of performs, the present invention has the following advantages:

1. In the invention, the performs are removed from the molds for the cooling process, and thus the injection molding process of the performs is separated from the cooling process of the preforms, so that the injection molding machine can continue the injection molding process without interruptions in order to improve the production efficiency of the injection molding machine.

2. Since the cooling fetch apparatus of the invention performs a cooling action of a first stage to the external brink of each perform when the preforms of the first clamp portion are fetched, therefore when the performs of the second clamp portion and the first clamp portion are coupled, the first clamp portion and the second clamp portion perform a cooling action of a second stage to the performs as well as the external and internal brinks of the performs, and then the second clamp portion carries the preforms to the material collection position to continue the cooling effect of a third stage to the internal brink of the performs. Therefore, the present invention can provide a multi-stage cooling action for each perform to assure the cooling effect of the performs, and improve the yield rate of each preform effectively.

3. In the invention, three stages are adopted for completing the cooling action to each perform removed sequentially from the second clamp portion of the second fetch mechanism, so that the cooling time for each remaining perform can be extended to provide a better cooling effect.

4. Since the external brink of each cooling pipe on the second fetch mechanism corresponds precisely to the internal brink of each fetched perform, therefore each preform can be attached closer to the cooling source for a quick cooling effect, and the internal brink of each preform is attached onto the cooling pipe for providing a supporting effect on the bottle mouth of each perform to prevent the bottle mouth of each preform from being deformed by the thermal contraction caused by the cooling effect, in order to assure the circularity of the bottle mouth, such that when the bottle cap is attached to the bottle mouth of the perform, a good airtightness can be achieved.

5. The invention uses the first fetch mechanism to remove the performs from the mold and then transfer the performs to the second fetch mechanism for cooling, so that the volume of the first fetch mechanism can be reduced effectively, and the weight carrying capacity of the invention can be reduced greatly, and the first fetch mechanism can be moved in a high speed, and the speed of removing each preform can be faster, so as to improve the overall efficiency of the manufacturing process.

6. The invention can greatly reduce the weight carrying capacity of the first fetch mechanism and the power source for driving the first fetch mechanism to achieve the effect of saving energies and lowering costs.

While the invention has been described by means of specific embodiments, numerous modifications and variations could be made by those skilled in the art without departing from the scope and spirit of the invention set forth in the claims.

What is claimed is:

1. A cooling fetch apparatus of preforms, installed on a side of an injection molding machine, for fetching a preform formed by a mold of the injection molding machine, and the cooling fetch apparatus of preforms comprising:

a first fetch mechanism, having a first transmission arm and a first clamp portion, and the first transmission arm being linearly displaceable in a first direction, and the first clamp portion being disposed at an end of the first transmission arm for synchronously moving the first transmission arm, and the first fetch mechanism using the first clamp portion to fetch a plurality of preforms formed by the mold of the injection molding machine from the mold, the first clamp portion including a plurality of preform suction pipes having a corresponding preform formed by the mold, the first clamp portion performing a cooling effect of a first stage to an external brink of the preforms, and after the injection molding machine removes each preform, an injection molding is performed to the preforms again to prepare the first fetch mechanism for a next fetching process;

a second fetch mechanism, having a second transmission arm and a second clamp portion, and the second transmission arm being linearly displaceable in a second direction, the second clamp portion including a plurality cooling pipes disposed thereon, and the second clamp portion being disposed at an end of the second transmission arm, and moving synchronously with the second transmission arm, and the second fetch mechanism using the second clamp portion to fetch the plurality of preforms on the first clamp portion of the first fetch mechanism, such that the first clamp portion of the first fetch mechanism and the second clamp portion of the second fetch mechanism perform a cooling effect of a second stage to both external and internal brinks of each preform simultaneously, and continue performing a cooling effect of a third stage to the internal brink of each preform after the preforms are fetched, and after the second clamp portion fetches a predetermined quantity of preforms, and each preform situated on the second clamp portion is removed sequentially in a batch;

wherein the first transmission arm drives the first clamp portion to be linearly displaced between a start position, a target position and a plurality of cooling positions; and the target position is situated in the mold, the cooling positions are situated on a side corresponding to the second fetch mechanism and are selectively set relative to the cooling pipes, and the start position is situated between the target position and the cooling positions, so that when the mold has not complete the injection molding, the first clamp portion is situated at the start position to wait for opening the mold.

2. The cooling fetch apparatus of preforms of claim 1, wherein the first fetch mechanism is linearly displaced on a rail.

3. The cooling fetch apparatus of preforms of claim 1, wherein the start position is situated adjacent to a side of the mold.

4. The cooling fetch apparatus of preforms of claim 1, wherein the first clamp portion is moved to the target position to fetch each preform in the mold, when the mold is opened after completing the injection molding.

5. The cooling fetch apparatus of preforms of claim 1, wherein the first clamp portion is moved from the target position to the cooling position, after the first clamp portion fetches each preform in the mold.

6. The cooling fetch apparatus of preforms of claim 5, wherein the cooling position is divided into a first fetch position, a second fetch position and a third fetch position.

7. The cooling fetch apparatus of preforms of claim 1, wherein the first clamp portion includes a first channel and a second channel, and the first channel is coupled with a first air nozzle for performing air suction, and the second channel is provided for circulating a cooling liquid, and each preform suction pipe is sheathed with a built-in element by a sleeve, and an end of the built-in element has an opening for containing the preform, and another end of the built-in element has an air hole, a water inlet hole and a water outlet, and an end of the air hole is interconnected with the first channel, and another end of the air hole is interconnected with an opening of the built-in element, and a spiral groove surrounded around an external brink of the built-in element, and ends of the water inlet and the water outlet are interconnected with the second channel, and other ends of the water inlet and the water outlet are interconnected with the spiral groove.

8. The cooling fetch apparatus of preforms of claim 7, wherein the cooling liquid circulated by the second channel enters into a spiral groove of the built-in element external brink along the water inlet, and flows out from the water outlet.

9. The cooling fetch apparatus of preforms of claim 7, wherein the preforms are attached closely with the opening of the preform suction pipe by a vacuum effect produced by the air suction of the first air nozzle, when each preform is accommodated in the opening of each built-in element.

10. The cooling fetch apparatus of preforms of claim 1, wherein the second clamp portion is disposed at an end of the second transmission arm, so that the second clamp portion can be move back and forth between a material collection position and a material fetch position.

11. The cooling fetch apparatus of preforms of claim 1, wherein a third channel and a fourth channel disposed therein, and the third channel is provided for connecting a second air nozzle for conducting air suction, and the fourth channel is provided for circulating a cooling liquid, and the cooling pipes have penetrating hole penetrating through their axes, and the penetrating hole is interconnected with the third channel of the second clamp portion, and the cooling pipe includes a cooling channel interconnected with the fourth channel, and the shape of the external brink of the cooling pipe corresponds precisely with the shape of the internal brink of the preform.

12. The cooling fetch apparatus of preforms of claim 11, wherein the preforms are attached closely with the cooling pipes by a vacuum effect produced by the air suction of the second air nozzle, when the preforms are fetched by the cooling pipes.

13. The cooling fetch apparatus of preforms of claim 1, wherein the second fetch mechanism includes a conveying mechanism disposed at the bottom of the second fetch mechanism for carrying the preforms unloaded by the second clamp portion for conveying each preform.

14. The cooling fetch apparatus of preforms of claim 13, wherein the conveying mechanism is a conveyor belt structure.

15. The cooling fetch apparatus of preforms of claim 13, wherein the second clamp portion is pivotally coupled to an end of the second transmission arm, such that the second clamp portion can be rotated back and forth between a material collection position and a material unload position.

16. The cooling fetch apparatus of preforms of claim 1, wherein the second fetch mechanism further includes a demister disposed adjacent to the second fetch mechanism, for blowing cool air to expedite cooling each preform on the second fetch mechanism.

\* \* \* \* \*